(12) United States Patent
Rajopadhye et al.

(10) Patent No.: US 7,412,586 B1
(45) Date of Patent: Aug. 12, 2008

(54) SWITCH MEMORY ARCHITECTURES

(75) Inventors: Sanjay Rajopadhye, Fort Collins, CO (US); Lakshminarayanan Renganarayana, Fort Collins, CO (US); Gautam Gupta, Fort Collins, CO (US)

(73) Assignee: Colorado State University Research Foundation, Fort Collins, CO (US)

( * ) Notice: Subject to any disclaimer, the term of this patent is extended or adjusted under 35 U.S.C. 154(b) by 557 days.

(21) Appl. No.: 10/901,102

(22) Filed: Jul. 29, 2004

Related U.S. Application Data

(60) Provisional application No. 60/490,515, filed on Jul. 29, 2003.

(51) Int. Cl.
*G06F 15/80* (2006.01)

(52) U.S. Cl. .......................................... 712/10

(58) Field of Classification Search .................... 712/10
See application file for complete search history.

(56) References Cited

U.S. PATENT DOCUMENTS 5,522,083 A * 5/1996 Gove et al. ..................... 712/22
6,791,939 B1 * 9/2004 Steele et al. ................ 370/217

* cited by examiner

*Primary Examiner*—Eddie P Chan
*Assistant Examiner*—Robert E Fennema
(74) *Attorney, Agent, or Firm*—Lathrop & Gage LC

(57) ABSTRACT

The present invention provides a switch memory architecture (SMA) consisting of: (i) processing elements (PE) (ii) memory banks (MB), and (iii) interconnect switches (ISWITCH). The present invention allows for efficient, potentially unbounded data transfer between two adjacent processes by passing a memory handle and the status registers (memory control information) of the MB. This function may be performed by the ISWITCH.

19 Claims, 4 Drawing Sheets

SWITCH MEMORY ARCHITECTURES

CROSS-REFERENCE TO RELATED APPLICATIONS

This application makes reference to U.S. Provisional Patent Application No. 60/490,515, entitled "Switched Memory Architectures," filed Jul. 29, 2003, the entire contents and disclosure of which is hereby incorporated by reference.

BACKGROUND OF THE INVENTION

1. Field of the Invention

The present invention relates generally to reconfigurable computing platforms.

2. Description of the Prior Art

The electronic industry currently faces the challenge of designing high performance embedded systems called Systems-on-a-Chip. Specialized hardware circuits called processor array architectures are an important option for implementing such systems. In most previous techniques for designing array architectures, the processors did not fully exploit the possibility of on-chip memory and runtime hardware reconfiguration. These features are becoming more critical to the electronic industry. However, current technologies do not fully exploit these features and operate inefficiently with large slowdown in execution times.

An example of such a current restrictive technology is a systolic array. Systolic Arrays are application-specific architectures proposed by Kung and Leiserson 25 years ago for direct very large scale integration (VLSI) implementation of programs. A systolic array consists of a (possibly virtual) grid of simple, non-programmable processing elements (PEs) each with a few registers of local storage and connected to its nearest neighbors. Although they are elegant, and systematic methods for automatically designing systolic arrays from high level programs are now available, they have some serious limitations. For example, the constraints on locality and regularity are too restrictive for modern VLSI circuits. Judiciously designed long wires are thus common in most ASICs. Furthermore, systolic arrays constrain the PEs to have only a fixed number of registers, but current technology allows custom memory blocks to be distributed throughout the circuit. Also, only a small, proper subset of loop programs may be compiled to systolic arrays.

SUMMARY OF THE INVENTION

It is therefore an object of the present invention to provide a Switch Memory Architecture (SMA) model.

According to a first broad aspect of the present invention, there is provided a switch memory architecture comprising a d-dimensional grid of processing elements (PEs) where d is an arbitrary integer; one or more d-dimensional grids of memory banks (MBs) local to each processor; and one or more bounded inter-processor data transfers controlled by an interconnection switch, said interconnection switch comprising a (d+1)-dimensional grid of switching elements and connecting PEs to MBs.

According to a second broad aspect of the present invention, there is provided a method of deriving a switch memory architecture, comprising providing an n-dimensional system of affine recurrence equations (SARE) S having a domain D, a schedule $\lambda$ and an allocation M, wherein n is an arbitrary integer and $\lambda$ and M are integer matrices; constructing a new system of affine recurrence equations S' with domain D' by adding a dimension to D; modifying all variable references in S' by adding a 0 in the newly added dimension to make all dependences singular; uniformizing said dependences of S'; determining a schedule $\lambda'$ for the uniformized S'; constructing an allocation matrix $$M' = \begin{pmatrix} M & 0 \\ 0^T & 1 \end{pmatrix},$$

wherein the superscript T denotes transpose; constructing a space-time transformation T of S' from $\lambda'$ and M' such that $$T = \begin{bmatrix} \lambda' \\ M' \end{bmatrix};$$

and applying the space-time transformation T to S' to create the switch memory architecture.

According to a third broad aspect of the present invention, there is provided a method of reconfiguring an existing connection pattern between a grid of processing elements and a grid of memory banks, comprising providing a set of N memory banks (MB) connected via an interconnection switch to a set of N processing elements (PE) such that $PE_i$ is connected to $MB_i$ for i=1 to N, wherein N is an arbitrary integer; executing a transformation a distance $\delta$, wherein $\delta$ is a constant integer; and reconnecting $PE_i$ to $MB_{(i+\delta) \bmod N}$.

According to a fourth broad aspect of the present invention, there is provided a method of reconfiguring an existing connection pattern between a grid of processing elements (PE) and a grid of memory banks (MB) via an interconnection switch comprising a grid of switching elements (SE), comprising updating the state of each SE from that of a neighboring SE.

According to a fifth broad aspect of the present invention, there is provided a method for determining switching element settings of a d+1 dimensional grid of switching elements in an interconnection switch for achieving an arbitrary static linear interconnection map comprising a d×d matrix, A, wherein A is non-singular and each processing element (PE) reads from a distinct memory bank (MB), and further comprising constructing a (d+1)×(d+1) matrix $$A' = \begin{bmatrix} 0_d^T & 0 \\ A & 0_d \end{bmatrix},$$

wherein d is the number of dimensions of a PE grid, the superscript T denotes transpose, A' is a non-singular linear map with rank d, and wherein A' maps a PE at $z'=<z_1, \ldots z_d, 0>$ to MB $<0, a_1z_1, \ldots a_dz_d>$, wherein $z=<z_1, \ldots z_d>$ is an integer vector and refers to the source PE.

According to a sixth broad aspect of the present invention, there is provided a method for determining switching element settings of a d+1 dimensional grid of switching elements in an interconnection switch for achieving an arbitrary static linear interconnection map comprising a d×d matrix, A, wherein A is singular with an s-dimensional null space for an integer, s, wherein all processing elements (PE) in an s-dimensional affine space access the same memory bank (MB), and wherein A is not a projection such that $A^2 \neq A$, and further comprising factorizing A as the product of two matrices A=BC such that $C^2=C$ and BA=A, wherein B is a lower dimensional instance of a linear map from PEs to MBs.

According to a seventh broad aspect of the present invention, there is provided a method for determining the switching element settings of a d+1 dimensional grid of switching elements (SE) in an interconnection switch for achieving an arbitrary static affine interconnection map comprising $\Delta(z)$ =Az+a, wherein A is non-singular and every processing element (PE) reads from a distinct memory bank (MB), and further comprising homogenizing the desired affine map as a linear map of one extra dimension by writing $\Delta'$ (z, $$1) = \begin{bmatrix} A & a \\ 0_d^T & 1 \end{bmatrix} \begin{pmatrix} z \\ 1 \end{pmatrix},$$

wherein $\Delta(z)$=Az+a is the desired affine map; and constructing a (d+2)×(d+2) matrix $$A' = \begin{bmatrix} 0_d^T & 0 & 0 \\ A & 0_d & a \\ 0_d^T & 0 & 1 \end{bmatrix}.$$

According to an eighth broad aspect of the present invention, there is provided a method for determining the switching element settings of a d+1 dimensional grid of switching elements (SE) in an interconnection switch for achieving an arbitrary static affine interconnection map comprising $\Delta(z)$ =Az+a, wherein A is singular with an s-dimensional null space for an integer, s, wherein all processing elements (PE) in an s-dimensional affine space access the same memory bank (MB), and wherein A is not a projection such that $A^2 \neq A$, and further comprising factorizing A as the product of two matrices A=BC such that $C^2=C$ and BA=A, wherein B is a lower dimensional instance of a linear map from PEs to MBs.

According to a ninth broad aspect of the present invention, there is provided a method for determining initialization and reconfiguration of switching element (SE) settings of a d+1 dimensional grid of SEs in an interconnection switch for achieving an arbitrary dynamic affine interconnection map comprising $\Delta(p,t)=A_p p+A_t t+a$ wherein p is a d-dimensional vector representing the processing elements and memory banks, t is a k-dimensional vector representing the time, and $A_p$ and $A_t$ are, respectively, d×d and d×k integer matrices, wherein $A_p$ is non-singular and every PE reads from a distinct MB comprising constructing a (d+k+2)×(d+k+2) matrix $$A' = \begin{bmatrix} 0_d^T & 0 & 0 & 0_k^T \\ A_p & 0_d & a & A_t \\ 0_d^T & 0 & 1 & 0_k^T \\ 0_{k \times d} & 0_k & 0_k & I_k \end{bmatrix},$$

wherein $\Delta(p,t)=A_p p+A_t t+a$ is the dynamic map.

According to a tenth broad aspect of the present invention, there is provided a method for determining initialization and reconfiguration of switching element (SE) settings of a d+1 dimensional grid of SEs in an interconnection switch for achieving an arbitrary dynamic affine interconnection map comprising $\Delta(p,t)=A_p p+A_t t+a$ wherein p is a d-dimensional vector representing the processing elements and memory banks, t is a k-dimensional vector representing the time, and $A_p$ and $A_t$ are, respectively, d×d and d×k integer matrices, wherein A is singular with an s-dimensional null space for an integer, s, wherein all processing elements (PE) in an s-dimensional affine space access the same memory bank (MB), and wherein A is not a projection such that $A^2 \neq A$, and further comprising factorizing A as the product of two matrices A=BC such that $C^2=C$ and BA=A, wherein B is a lower dimensional instance of a linear map from PEs to MBs.

Other objects and features of the present invention will be apparent from the following detailed description of the preferred embodiment.

BRIEF DESCRIPTION OF THE DRAWINGS

The invention will be described in conjunction with the accompanying drawings, in which.

DETAILED DESCRIPTION OF THE PREFERRED EMBODIMENT

Although current Application Specific Integrated Circuits (ASICs) and Field Programmable Gate Arrays (FPGAs) reconfigurable computing technologies support on-chip memories and hardware reconfiguration, these features are not exploited by systolic arrays and their associated synthesis methods. Furthermore, ASICs and FPGAs have been insufficiently utilized due to poor exploitation of regularity in the application and architecture.

The device of the present invention is a new architectural model, called switch memory architecture (SMA), that overcomes the limitations of systolic arrays. The device of the present invention is more powerful than systolic arrays, may be systematically derived, and may be suitable for a wide range of target technologies. The power of the present invention may be illustrated by the fact that any SARE with any valid schedule may be implemented as an SMA without slowdown. The present invention characterizes the class of schedule and allocation functions that are suitable for SMAs and also describes a systematic procedure for deriving SMAs from SAREs.

SMAs are highly parallel, application specific architectures. An SMA consists of a grid of PEs, one or more grids of MBs, and one or more ISWITCH(es) that connect the PEs to the MBs. In embodiments of the present invention, the number of ISWITCHes is equal to the number of grids of MBs. The PEs, as in systolic arrays, are simple and non-programmable functional units: the program consists of control signals circulating between the PEs, and there is no instruction overhead. The MBs and ISWITCHes account for the current realities of VLSI technology, and make SMAs more general than systolic arrays. ISWITCHes are designed to achieve a special class of interconnections called affine interconnections, and are incrementally reconfigurable in a constant number of clock cycles.

With the widespread use of high performance embedded devices in "information appliances" such as cell phones, PDAs, and other hand-held devices, the electronic design industry is faced with the challenge of reducing the cost and design time of high-performance embedded systems. Recent advances in FPGA and Very Large Scale Integration (VLSI) technology have made automatic synthesis of high performance array architectures from high level specifications a viable option to reduce the cost and design time. Design tools like MMALPHA, described in F. Dupont de Dinechin et al., First Steps in Alpha, Technical Report 144, IRISA, 1999; PiCo, described in Robert Schreiber et al., PICO-NPA: High-level synthesis of nonprogrammable hardware accelerators, Journal of VLSI Signal Processing Systems, 31(2):127-1422, 2002; Compaan, described in E. Deprettere et al., Deriving process networks form matlab for embedded signal processing architectures and compiler, IEEE Computer, 70-76, April 2000; and PARO, described in PARO project: Piecewise linear algorithm and architecture research and optimization, provide techniques for hardware synthesis from high level descriptions, the entire contents and disclosures of which are hereby incorporated by reference.

The architectural model of these tools is usually a form of systolic array: a locally interconnected grid of simple processors with hardwired control. Although current computing platforms (ASIC, FPGA and other reconfigurable computers) support on-chip memories and hardware reconfiguration, the systolic array model and synthesis methods do not fully exploit either of these features. Again, current systems have not been fully utilized because they do not exploit the regularity provided by the architectures.

A device of the present invention is a new architectural model, called switch memory architecture (SMA), which goes beyond the systolic model, and exploits these crucial features. On-chip memory may be used to store and transfer intermediate values, and reconfiguration may be used for run-time switching of the memory-processor interconnect. A device of the present invention may be suitable for a wide range of target technologies ranging from ASIC and FPGAs to more general reconfigurable computing platforms. One method of the present invention derives SMAs from high level specifications.

It is well known that, the compute-intensive parts of a broad class of important applications may be modeled as Systems of Recurrence Equations (SREs). Of particular interest are Systems of Affine Recurrence Equations (SAREs, i.e. SREs where the dependences are affine functions) and Systems of Uniform Recurrence Equations (SUREs, i.e. SREs in which the dependences are uniform). There are well-known methods to derive systolic arrays from SAREs that satisfy certain conditions. These methods aim at producing a processor array in which the interconnections between the processors are local and bounded, and every processor has a fixed size memory. This leads to a finite number of registers independent of the problem size.

Systolic array synthesis involves finding a space-time mapping of the problem domain, such that the mapping results in an architecture in which inter-processor communication is achieved with (i) a fixed amount of memory in each processor, (ii) a fixed number of interconnections, and (iii) fixed length interconnections. These properties are referred to as systolic properties. The nature of the data dependences in the problem heavily influences the existence of space-time mappings that respect the above constraints. For example, uniform dependences directly translate to architectures with the above properties, but it is not always easy to find such space-time mappings for affine dependences.

A crucial step in systolic synthesis is the transformation of affine dependences into uniform ones, a process called uniformization. Uniformization is described in the following documents: S. V. Rajopadhye, Synthesizing systolic arrays with control signals from recurrence equations, Distributed Computing, 3:88-105, May 1989, L. Rapanotti, On the Synthesis of Integral and Dynamic Recurrences, PhD thesis, University of New Castle upon Tyne, March 1996, F. C. Wong et al., Broadcast removal in systolic algorithms, In International Conference on Systolic Arrays, 403-412, San Diego, Calif., May 1988, and W. Shang, E. Hodzic, and Z. Chen, On uniformization of affine dependence algorithms, IEEE Transactions on Computers, 45(7):827-840, July 1996, the entire contents and disclosures of which are hereby incorporated by reference. The uniformization techniques may be classified broadly into two categories: those that are applicable when the dependence matrix is singular and the ones that are applicable when the dependence matrix is non-singular.

A dependence is a relation between a consumer and a producer of a value. Whenever the producer and consumer of the value are not mapped to the same processor, a route in the processor space from the producer to the consumer needs to be located to transfer the value. In the case of uniform dependence, this translates to a fixed length interconnection between the producer and the consumer. In the case of an affine dependence, the producer and the consumer could be far apart, and hence a fixed length interconnection between them may not be possible. In such a case, a route for the value from the producer to the consumer proceeds through intermediate processors. Uniformization aims at finding such routes, by decomposing an affine dependence into a sequence of uniform dependences. Essentially, uniformization transforms affine dependences into uniform ones.

However, there is an important class of SAREs for which such a transformation is not possible, except by adding an additional dimension to the domains of the SARE. This induces an extra dimension in the processor array, and is therefore not a practically viable option as it yields an inefficient processor array. One possible method to overcome this is to view the additional dimension as memory, since the variables defined in this space are localization variables. It is, in general, impossible to satisfy the last requirement within the purely systolic model, without a slowdown in the schedule by at least one dimension.

The present invention has advantages over the prior devices and methods. SMAs may exploit on-chip memory and reconfiguration. SMAs are more powerful than systolic arrays, and may be implemented efficiently without any slowdown. SMAs are highly parallel, application specific, non-programmable architectures with no instruction overhead. One of the features of embodiments of the present invention is that a potentially unbounded data transfer between two adjacent processors may be achieved by passing a memory handle and the status of the registers of the memory. The memory handle may be passed by simply reconfiguring a processor-memory interconnection switch, so that a neighbor processor owns the memory. A method according to an embodiment of the present invention allows for systematic derivation of SMAs from SAREs.

In embodiments of the present invention, SMAs have three main components: a d-dimensional grid of PEs, one or more d-dimensional grids of MBs, and one or more ISWITCH(es) that connect the PEs to the MBs for some integer, d. In embodiments of the present invention, the number of ISWITCHes is equal to the number of grids of MBs. The PEs are simple and non-programmable functional units: the program consists of control signals circulating between the PEs, and there is no instruction overhead.

Figure 1:
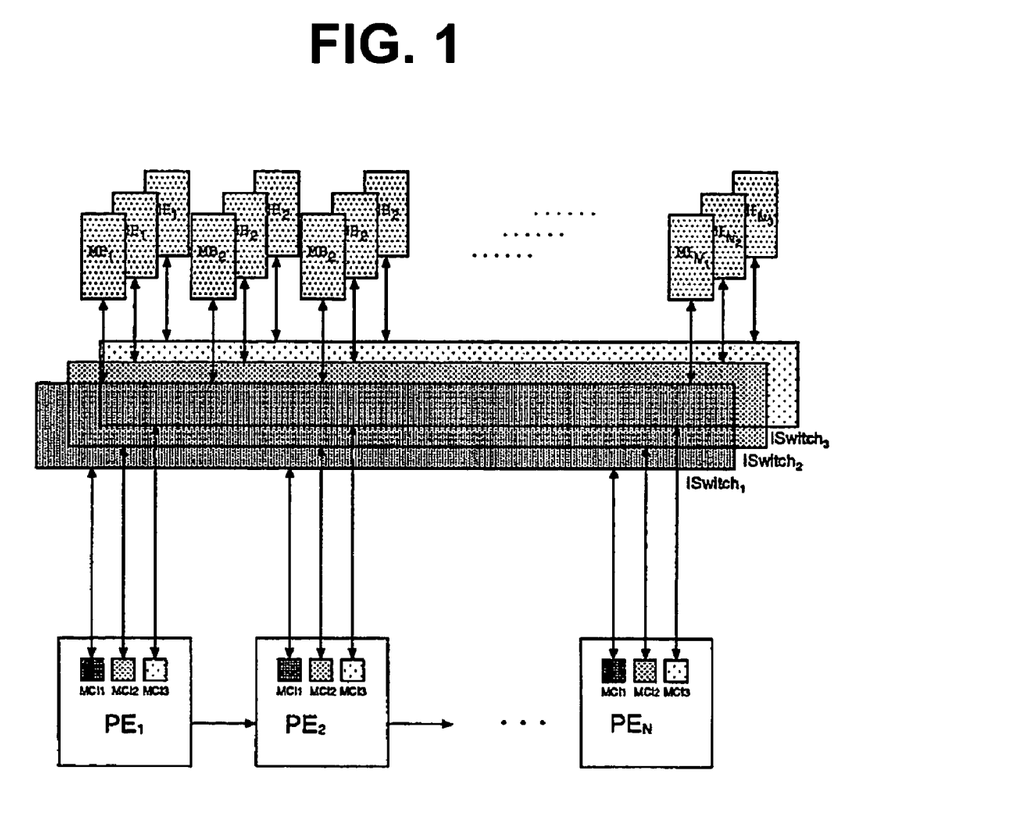
FIG. 1 is an architectural diagram illustrating a SMA constructed in accordance with an embodiment of the present invention.

As illustrated in FIG. 1, a SMA of the present invention may consist of: (i) processing elements (PE) (ii) memory banks (MB), and (iii) interconnect switches (ISWITCH). PEs may be used to implement datapath logic, MBs may be used to store and transfer intermediate and final values, and ISWITCHes may be used for connecting PEs to MBs. At any given time, an MB is local to and owned by exactly one PE. The control information used for accessing MBs, i.e. memory address register and memory data register, is called memory control information (MCI), and is stored in the PEs.

FIG. 1 shows a set of N PEs, three ISWITCHes, each connecting a set of N MBs to the N PEs. N is an arbitrary integer. FIG. 1 shows a one-dimensional grid of PEs connected to three sets of one-dimensional MBs through three ISWITCHes. At any instant, the ISWITCH implements a specific interconnection and a given MB is connected to exactly one PE for read access. In embodiments, there are 1-to-1 mappings, but, in other embodiments, broadcast connections are also possible. The connected PE may be said to own the "handle" (status/data registers, etc.) of the MB. Write access is provided through a separate mechanism. Dedicated 1-to-1 connections between the PEs and MBs are usually sufficient, but, if needed, the full generality of an ISWITCH may be used as well.

The PE-MB grid is $N_1 \times N_2 \times \ldots N_d$ rectangular (where $N_1$, $N_2 \ldots N_d$, are arbitrary integers) but for simplicity in the following explanation, the grid is assumed to be an $N^d$ cube, for some arbitrary integer N, d refers to the dimension of the grid. The ISWITCH is itself a d+1-dimensional grid of simple Switching Elements (SEs), the PEs and MBs being aligned to two of its faces, not necessarily distinct. Note that it connects $\Theta(N^d)$ inputs to $\Theta(N^d)$ outputs but has only $\Theta(N^{d+1})$ switches. This is less than a general crossbar, which would require $\Theta(N^{2d})$ switches, but more than an Omega network, which would need only $\Theta(N^d \lg N)$ SEs. Hence, it is cheaper and simpler than a crossbar, but also more restrictive, allowing only a limited class of interconnections. However, SMAs are carefully designed so that within this class, it is incrementally reconfigurable in a constant number of clock cycles.

In an ISWITCH there are r(d+1) wires passing through each SE, r in each canonical dimension, where r is a small integer, typically 1 or 2. Each wire is thus identified by a unique integer. The SEs are simple state machines with just a few bits of state. The switches are classified into types (visualized as colors) specified by a pair of integers, e.g., a <1,2> type switch is capable of connecting wire 1 to wire 2 passing through the SE.

The present invention may allow for potentially unbounded data transfer between two adjacent processes by passing a memory handle and the status registers (MCI) of the MB. This function may be performed by the ISWITCH.

An interconnect switch or ISWITCH is a grid of simple switching elements (SEs). An ISWITCH is typically simpler and cheaper to use than a crossbar. An ISWITCH provides for implementation of a special class of interconnections, and is carefully designed so that within this class, it is incrementally reconfigurable in a constant number of clock cycles. An ISWITCH provides a general reprogrammable processor-to-memory or processor-to-processor interconnection fabric.

An ISWITCH may connect a grid of MBs to a grid of PEs. The ISWITCH incrementally reconfigures the MB-PE interconnection. For example, a set of N MBs may be connected to N PEs by an ISWITCH, such that $PE_i$ is connected to $MB_i$, (for i=1 ... N) at the beginning. An interconnect reconfiguration pattern of a rotation by a constant distance, δ, may be performed at every clock cycle. For such an interconnection pattern, the ISWITCH, at every clock cycle, (re)connects $PE_i$ to $MB_{(i+\delta) \mod N}$. Such an interconnection reconfiguration, accompanied by the transfer of MCI(i) to MCI((i+δ) mod N) by all processors, may be used to transfer an unbounded amount of data stored in a memory bank $MB_i$ (owned by processor $PE_i$), to processor $PE_j$ by connecting $MB_i$ to $PE_j$ and passing the MCI (related to $MB_i$) from $PE_i$ to $PE_j$, where j=(i+δ)mod N.

The present invention provides an ISWITCH to reconfigure the MB-PE interconnection when necessary. The specific time instants when the ISWITCH reconfigures depends on the particular application, and may be pre-programmed when the SMA is designed. One advantage of the present invention is that for a large class of application programs, the reconfiguration may be achieved by very efficient and simple extension to pre-existing paths in the ISWITCH.

The PEs and MBs of SMAs may be implemented in the traditional ways as datapath logic and memory modules, respectively. According to the present invention, the implementation of ISWITCH may require an arrangement of the PEs and MBs such that the incremental shifting of the PE-MB interconnections may be achieved efficiently. Every reconfiguration of a PE-MB interconnection is a simple extension by a constant distance of the previous connection. The present invention may exploit this fact for efficient interconnect reconfiguration by using ISWITCH.

The distribution and logical organization of the SEs ensure that a given permutation may be rapidly reconfigured to achieve a new, incrementally different permutation. The specific time instants when reconfiguration is done depend on the application at hand, and may be pre-programmed when the SMA is designed.

To reconfigure the ISWITCH, a command is broadcast to all the SEs. The command specifies: a color c (i.e., a pair of integers specifying the input and output wires involved) and a displacement δ (a signed integer). In response, each SE simply copies the state bit of its c-color switch into the c-color state bit of its δ-neighbor SE. For SEs on the boundary of the ISWITCH, the state may either wrap around (i.e., the state of the last SE is copied into the first one), or may be defined as a special case (provided as an external input). Accompanying this change of interconnection and independent of the ISWITCH, each PE forwards to a neighboring PE, its memory handle, thus relinquishing its access to the MB. This simple forwarding between PEs may be accomplished by local connections in the PE grid.

Another way of viewing the reconfiguration is as follows. At any instant, the ISWITCH achieves a certain PE-to-MB mapping consisting of source to destination interconnection paths. Upon reconfiguration, each one of these paths is uniformly extended by a small constant. The mechanism is illustrated with two examples shown in FIGS. 2, 3 and 4.

Figure 2:
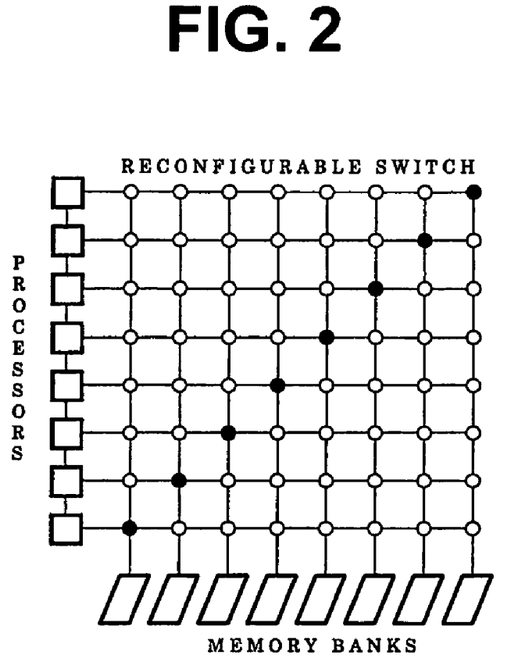
FIG. 2 is a schematic diagram of a two-dimensional reconfigurable interconnection switch in accordance with an embodiment of the present invention.
Figure 3:
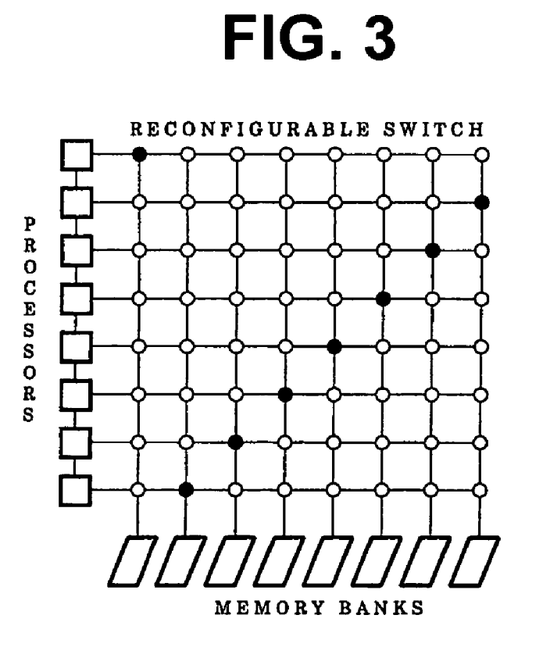
FIG. 3 is a schematic diagram of a two-dimensional reconfigurable interconnection switch in accordance with an embodiment of the present invention that has been extended by a distance d=1 from the switch in FIG. 2.

For one-dimensional arrays, i.e. a linear array of PEs connected to another linear array of MBs, the ISWITCH may be realized as an interconnect crossbar between the MBs and PEs. A two-dimensional ISWITCH is shown in FIG. 2. An interconnection reconfigured through an extension, by a distance of one, is shown in FIG. 3. The reconfiguration of the PE-MB interconnection is achieved by extending the current connection by a constant distance, δ, modulo the number of PEs and MBs. The initial position shows a configuration where the ISWITCH achieves an identity permutation: PE i is connected to MB i: the mapping is (i↔i). After reconfiguration, the set of interconnections are extended by 1 (modulo N because of the wraparound), and PE i is now connected to MB i+1, the new mapping being (i↔(i+1)mod N).

Figure 4:
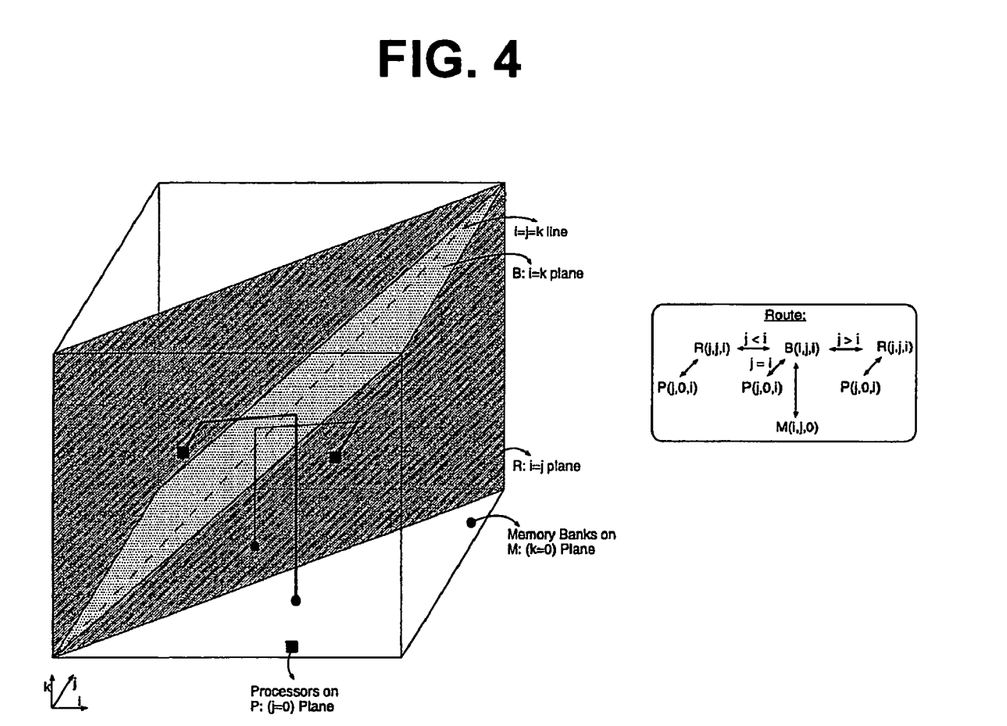
FIG. 4 is a schematic diagram illustrating the routing of a three-dimensional reconfigurable interconnection switch in accordance with an embodiment of the present invention.

For a two dimensional array of PEs connected to a two-dimensional array of MBs, the PEs, MBs, and ISWITCHes may be logically organized in three layers, processor, switch and memory bank layers. The three layers may be organized in a three-dimensional grid as shown in FIG. 4. The processor layer contains the PEs and every PE is connected to a switch-node in the switch layer. The switch layer implements the ISWITCH and contains switch-nodes that connect PEs to MBs. The MBs are in the top layer and are connected to the switch-nodes.

In FIG. 4, the PEs may be aligned to the j=0 (P) plane, and the memory banks may be aligned to the k=0 (M) plane. A three-dimensional grid of switching elements may connect the PEs to the MBs. At each index point, <i,j,k> there are two types of SEs. The darkly shaded SEs (R (i=j) plane) are capable of connecting the two horizontal wires (front-to-back with the left-to-right), and the lightly-shaded SEs (B (i=k) plane) may connect the vertical wire to the left-to-right one. At the instant shown, the only SEs that are on are the ones on the i=k plane and the ones on the i=j plane. It is easy to verify that the ISWITCH achieves a permutation where PE <i,k> is connected to MB <k,i>, thus achieving a transpose permutation.

A value from a MB at (i,j,0) in the M plane to a PE at (j,0,i) may be routed as follows. First, the value travels along k a distance of i until it hits the B (i=k) plane. Next, the value travels along i a distance of j−i until the value hits the R (i=j) plane. Next, the value travels along j a distance of −j to meet the PE at (j,0,i) on the P plane. The reconfiguration of the PE-MB interconnection may be achieved by shifting the B (i=k) and R (i=j) plane. The switch may have $3n^2$ wires and $2n^3$ switches. Two switches may be placed at each possible intersection. At any time instant exactly $2n^2$ switches are on and the rest are off. The set of switches that are on belong to one of the two (R or B) planes. Switch reconfiguration is achieved in a distributed fashion simply by each switch transferring its state to a neighbor switch.

As mentioned above for FIG. 4, there are $3n^2$ wires, $n^2$ in each of the three canonic directions. Each SE has two switches: the ones in the lightly-shaded plane are capable of connecting the i and the k wires, and the darkly-shaded ones may connect the i wires to the j wires. All the lightly-shaded switches of the i=k plane and the darkly-shaded switches of the i=j plane are on. The remaining switches are off. The permutation that is achieved is equivalent to the transpose, specifically, PE [i,0,k] is connected to MB [k,i,0]. To visualize this, imagine the switches as "mirrors" that also allow "light" to "pass through." The vertical wire out of the MB at [i,j,0] in the M plane is connected to the horizontal (i direction) wire at the lightly-shaded plane, and is connected to the other horizontal (j direction) wire at the darkly-shaded plane, which leads to PE [j,0,i]. This sequence of connections may be written as [i,j,0]↔[i,j,i]↔[j,j,i]↔[j,0,i].

To see how a reconfiguration is achieved, let us imagine that a command is issued such as <lightly-shaded plane, [0,0,1]> specifying that the lightly-shaded plane is shifted in the positive k direction. So the plane where the lightly-shaded switches are on is now given by i+1=k. The connections may be traced as [i,j,0]↔[i,j,i+1]↔[j,j,i+1]↔[j,0,i+1]. Thus, the new PE-to-MB map is (i,j↔j,i+1). Similarly, a shift of the darkly-shaded plane of switches achieves a reconfiguration of the j coordinate in the map.

In implementing the present invention, the ISWITCH components may be made of silicon. In a SMA, a large portion of the silicon may be dedicated to ISWITCHes. However, this is practically viable, and many of the current technologies devote a substantial amount of the silicon resources for routing as described in Florent de Dinechin, The price of routing in FPGAs, Technical Report RR-3772, INRIA, September 1999, and Andre DeHon, Reconfigurable Architectures for General-Purpose Computing, PhD thesis, MIT, August 1996, the entire contents and disclosure of which are hereby incorporated by reference.

One of the important features of systolic arrays is the availability of well understood tools and techniques for their automatic synthesis from high level specifications like SAREs. In this context, the polyhedral model has proved to be very useful in formulating and solving several issues like dependence analysis, scheduling and allocation. The theory and techniques developed in the polyhedral model and systolic synthesis are directly applicable in the derivation of SMAs from SAREs. This is one of the major strengths of the SMA model.

A method of the present invention allows the derivation of an SMA from an SARE that admits any valid schedule. In an n-dimensional SARE S with domain D with a valid schedule λ (where λ is an integer matrix), the procedure to derive an SMA for S may be as described below.

Add a dimension to D. Construct a new SARE S' with domain D' by adding an extra dimension to D.

Align. Modify all variable references in S' by adding a 0 in the newly added dimension. This would make all the dependences singular.

Uniformize all dependences. The previous two steps have made all the dependences singular and hence null-space pipelining or routing may be used to uniformize all the dependences of S'. Let R be the set of uniformization vectors used for uniformization of the affine dependences using the extra dimension.

Find a linear schedule. A schedule, λ', may be found for the uniformized SARE S' by simple extension of λ.

Find a projection vector of the form (u, 0). For S' find a projection vector, for example u', of the form u'=(u, 0), i.e. a vector with a zero last component, such that λ'u'≠0. Projection vectors of this form would allow us to treat the propagation points as memory elements local to a given processor. Using u (of u') construct the allocation matrix Π such that Πu=0. The allocation matrix Π' for S' may be constructed as $$\Pi' = \begin{pmatrix} \Pi & 0 \\ 0 & 1 \end{pmatrix}.$$

Compute the space-time transformation T. The space-time transformation matrix T of S' may be constructed from the schedule λ' as the initial rows and the projection matrix Π' as the rest of the rows. Construct $$T = \begin{bmatrix} \lambda' \\ \Pi' \end{bmatrix}.$$

7. Compute memory banks. Every uniformization vector φ∈R induces a set of P memory banks, where P is the number of processors. The size of each of these memory banks is equal to the number of points of D' mapped to a single processor by Π.

8. Compute ISWITCHes. The properties of ISWITCHes may be determined by the transformation of the uniformization vectors $\phi\in R$ by the space-time transformation T. For every uniformization vector $\phi\in R$, let $\phi'=T\phi$. The number of delays (or registers) involved in the inter-PE communication (of MCI) related to $\phi$ is denoted by $\delta_t$ and is given by $\delta_t=\phi(1:1)$. This is essentially $\lambda'\phi$. The distance by which the ISWITCH (related to a given $\phi$) shifts the PE-MB connections is denoted by $\delta_d$ and is given by $\delta_d=\phi(2:n)$. This is essentially $\Pi\phi$. The number of cells a value travels within a memory bank in a given clock cycle is denoted by $\delta_m$ and is given by $\delta_m=\phi'(n+1:n+1)$. For any uniformization vector $\phi\in R$ there may be an intra-memory bank transfer when $\delta_d=0$, i.e. the shifting distance of the ISWITCH is zero. In this case an ISWITCH may not be required. However, when $\delta_d\neq 0$ there may be an inter-memory bank transfer and this is achieved by using an ISWITCH which shifts the PE-MB connections by a distance $\delta_d$.

Build the SMA. Apply the space-time transformation T to S' and in the resulting SARE the present invention may interpret the initial dimensions as time, and next dimensions as processors and the last dimension as memory. The number and size of the memory banks associated with a single processor, and the ISWITCHes may be computed as discussed above using the uniformization vectors $\phi$.

SMA is a very rich model, more powerful than systolic arrays. It is more advantageous to use SMA to overcome the prior limitations, such as slowdown imposed by systolic arrays, by using efficient implementation of SAREs with valid schedules. In addition, SMA may be used to implement SAREs with multi-dimensional schedules and the ISWITCHes may realize very general interconnection patterns like any affine permutation. SMAs may be used to exploit on-chip memories and reconfiguration.

An important issue in the wide-spread use of reconfigurable computing is the lack of a computational model that supports scalability and application portability across different reconfigurable hardware technologies. Projects like PipeRench, as described by S. Goldstein et al., PipeRench: A reconfigurable architecture and compiler, IEEE Computer, pp. 70-76, April 2000, SCORE, as described by B. Caspi et al., Stream computations organized for reconfigurable execution (SCORE): Introduction and tutorial, August 2000, www.cs.berkeley.edu/projects/brass/documents/score.tutorial.html, and Garp, as described by T. Callahan et al., The Garp architecture and C compiler, IEEE Computer, pp. 62-69, April 2000, the entire contents and disclosures of which are hereby incorporated by reference, address these issues from different viewpoints. Broadly, the goal is to provide an abstract computational model that virtualizes the logic and storage resources of the reconfigurable hardware. The abstract computational model is either exposed to the programmer/user or is used internally by a compiler as an architectural model for code/circuit generation. Use of such an abstract model allows portability across different technologies and scalability with respect to number of resources.

In the context of hardware synthesis for compute-intensive loops, systolic arrays have been a very useful and successful computational model for VLSI/FPGA targets as discussed in Robert Schreiber et al., PICO-NPA: High-level synthesis of nonprogrammable hardware accelerators, Journal of VLSI Signal Processing Systems, 31(2):127-142, 2002, the entire contents and disclosure of which is hereby incorporated by reference. The abstract view discussed by Schreiber of computational resources provides portability across target technologies and the architectural regularity supports scalability with respect to number of resources. The present invention, however, provides for an abstract computational model which includes memory and reconfiguration as fundamental features. The present invention also retains the abstract view of hardware resources and architectural regularity of systolic arrays, which facilitate portability and scalability. The present invention may also be well suited for use by hardware synthesis compilers that target reconfigurable hardware.

Embodiments of the present invention may also include derivation of/compilation to SMAs. The present invention may extend the SMA derivation procedure to SAREs with multi-dimensional schedules. An optimal memory allocation scheme, such as the one proposed by F. Quillere and S. Rajopadhye, Optimizing memory usage in the polyhedral model, ACM Transactions on Programming Languages and Systems, 22(5):773-859, September 2000, the entire contents and disclosure of which is hereby incorporated by reference, may be useful in deriving architectures with memory. The present invention is very rich in terms of expressibility. The interconnect reconfiguration may be used as a spatial operand transport mechanism for distributed processor architectures, particularly vector multi-processors.

In embodiments of the present invention, alternative interconnection patterns may arise when compiling loop programs to SMAs. In such programs, each computation may be labeled by an integer vector in an iteration space. In general, there are sets of points, one set for each statement in the program, and each set has its own, possibly distinct, iteration space.

In designing a SMA for the program, these computations are mapped to the architecture by three mapping functions (each of them is an affine function over integer vectors): a schedule, $\Lambda_x: Z^{nx} \to Z^k$, a processor allocation, $\Lambda_x: Z^{nx} \to Z^{dx}$, and a memory allocation, $M_x: Z^{nx} \to Z^{mx}$. These functions specify that for any point z in the iteration space of the statement X, the computation of X[z] is performed at time instant $\Lambda_x z$ by PE $\Pi_x z$, and then stored at the memory location $M_x z$ (in the MB of the processor $\Pi_x z$: the "owner-computes" convention is used). The mapping functions are usually many-to-one: a many-to-one schedule exploits parallelism, a many-to-one processor allocation is needed for work-efficiency so that a PE is used for many computations, and a many-to-one memory allocation enables memory reuse.

An affine map is a function $\Gamma: Z^n \to Z^m$ defined as $\Gamma(z)=Fz+f$, where F is an m×n integer matrix and f is an integer m-vector. Embodiments of the present invention are concerned with affine dependence programs, and in architectures derived by affine schedules and allocations. Because affine functions are closed under composition, the PEs and MBs are identified, respectively, by vectors in a processor space and a memory space, and the resulting interconnection patterns are also affine maps: PE p will need to read from a MB associated with a PE specified by an affine function $\Delta(p)=Ap+a$ of p. This is referred to as the PE-to-MB map.

Depending on the choice of the schedule and allocation functions, there are two classes of interconnection maps: static, where the PE-to-MB interconnection map is invariant with time, and dynamic, where the mapping changes as the computation proceeds. The full generality of an ISWITCH is only needed for a dynamic interconnection map.

For static interconnections, depending on the PE-to-MB map $\Delta$, the following classification and corresponding physical implementation apply.

Identity: $A=I_d$, the identity matrix, and $a=0$. Thus, PE z reads from MB z, its own memory. All PE-MB connections are independent, and may be implemented trivially.

Local: $A=I_d$, but $a\neq 0$. Thus, PE z reads from MB z+a, the MB of a neighboring PE. The PE-MB connections are still independent, and are implemented by simple, local interconnections: every PE p has a wire to MB p+a.

Broadcast: A, is singular, with an s-dimensional null space. All PEs in an s-dimensional affine space access the same MB. Also note that only the MBs in an (n−s)-dimensional subspace are being accessed, the remaining MBs are not. If A is a projection, i.e., $A^2=A$, then the source MB is local to the set of destination PEs, because for each source MB, there is one destination PE at a constant distance, a from it. Thus, a simple set of broadcast buses that span the null space of A are enough to achieve the interconnections without conflicts. If $A^2 \neq A$, then factorize A as the product of two matrices A=BC, such that rank(A)=rank(B)=rank(C), $C^2=C$ and BA=A. Although the described factorization is valid, some relaxations of these conditions are possible. To implement this, it should be noted that B is a lower dimensional instance of a point-to-point affine map and may be implemented by a technique discussed below. This is composed with a broadcast interconnection for Cz+a within each destination set.

Arbitrary, point-to-point: A is non-singular. Thus, every PE reads from a distinct MB, and long point-to-point interconnections are needed. All PE-MB connections are again independent. Note that if A is unimodular, the interconnection is a bijection on $Z^d$, thus each MB is being read, otherwise, only the MBs in a lattice of $Z^d$ are being read.

An arbitrary, point-to-point map is the most general static case. The implementation given below also provides the basis of the strategy for realizing a dynamic interconnection pattern, which may be done with an ISWITCH.

First consider a linear map, i.e., $a=0$. Since the connection is point-to-point, the easiest way to achieve it is to simply lay out wires from every source MB to its destination PE. However, if A has a real eigenvalue other than unity, an unbounded number of these direct source-to-destination wires overlap at some point in space. It is impossible to avoid this conflict except through an additional dimension of interconnection fabric.

Thus, a fabric similar to the ISWITCH is built, but without dynamic reconfigurability—the switches are set once and for all and may even be implemented through fusible links. The basic idea is to construct a (d+1)×(d+1) matrix $$A' = \begin{bmatrix} 0_d^T & 0 \\ A & 0_d \end{bmatrix}.$$

A' is a non-singular affine map with rank n, that maps PE at $z'=\langle z_1, \ldots z_d, 0 \rangle$ to MB $\langle 0, a_1 z_1, \ldots a_d z_d \rangle$. This particular alignment was chosen for ease of the explanation, but the method may be adapted for any affine alignment in light of the teachings of the present invention.

A' is factorized as a product of m+1 matrices for some arbitrary integer m. $A'=P_m P_{m-1} \ldots P_1 P_0$, such that each $P_i$ is (d+1)×(d+1), has rank d, and is of the form $P_i = I_{d+1} + e_{j_i} u_i^T$, where $e_{j_i}$ is the $j_i$-th unit vector and $u_i$ is an arbitrary vector whose $j_i$-th component is −1. Associated with each $P_i$ is a dimension $j_i$. From this factorization, the configuration of the switches is deduced as follows. For each $P_i$ only the SEs in the plane $u_i^T z'=0$ are active. In the active SEs, the switch that connects the $j_i$ dimension input wire to the $j_{i+1}$ dimension output wire is on. This rule is followed for each $i=1 \ldots m$. Thus, a simpler version of the ISWITCH mechanism, without dynamic reconfigurability enables any static affine interconnection map. It should be noted that other factorizations are also possible with only slight modifications to the architecture.

Now, when $a \neq 0$, there are two possible solutions. A simple one, that works only for static interconnections, is to add wires of length a at the output ports of the ISWITCH. Thus, the ISWITCH would implement the linear part, Az of the interconnection, and the translation would be implemented externally. A more general strategy, and one that is necessary when the interconnections are dynamic, is obtained by homogenizing the affine map to a linear map of one extra dimension as follows.

$\Delta(z)=Az+a$ is written as a map $$\Delta'(z, 1) = \begin{bmatrix} A & a \\ 0_d^T & 1 \end{bmatrix} \begin{pmatrix} z \\ 1 \end{pmatrix}.$$

Then the same idea as above is used and a factorization is determined, $P_m P_{m-1} \ldots P_1 P_0$ of the new (d+2)-dimensional matrix, $$A' = \begin{bmatrix} 0_d^T & 0 & 0 \\ A & 0_d & a \\ 0_d^T & 0 & 1 \end{bmatrix}$$

satisfying the same rules as above. Each $P_i$ is (d+2)×(d+2), has rank d+1, and is of the form $P_i = I_{d+2} + e_{j_i} u_i^T$, where $e_{j_i}$ is the $j_i$-th unit vector and $u_i$ is an arbitrary vector whose $j_i$-th component is −1, with the additional constraint that $j_i \leq d+1$. The switch settings are determined in exactly the same manner as above, with $u_i^T(z', 1)=0$ being the hyperplane that defines the active SEs. Note that the last component of $u_i$ is the constant of the hyperplane.

According to an embodiment of the present invention, a SMA is derived for a loop program by specifying affine schedule, processor allocation and memory allocation functions. Since these functions are affine, the PE-to-MB map that needs to be implemented at any given time instant is an affine function of the PE coordinates, as well as the current time instant $\Delta(p,t)=A_p p + A_t t + a$, where p is an d-dimensional vector representing the PE (and MBs), t is a k-dimensional vector representing the time, and $A_p$ and $A_t$ are, respectively, d×d and d×k integer matrices. The multidimensional schedule is implemented by a master controller which maintains the global time instant as a set of k integer counters.

The switch settings are determined by first constructing an (d+k+2)×(d+k+2) matrix $$A' = \begin{bmatrix} 0_d^T & 0 & 0 & 0_k^T \\ A_p & 0_d & a & A_t \\ 0_d^T & 0 & 1 & 0_k^T \\ 0_{k \times d} & 0_k & 0_k & I_k \end{bmatrix}.$$

It is factorized into $P_m \ldots P_0$ of the form $P_i = I_{d+k+2} + e_{j_i} u_i^T$, where $e_{j_i}$ is the $j_i$-th unit vector and $u_i$ is an arbitrary vector whose $j_i$-th component is −1, with the additional constraint that $j_i \leq d+1$. For the initial t=0 instant, the active SEs are those on the hyperplane $u_i^T(z', 1, 0_k^T)=0$. At each time step as the computation proceeds, the ISWITCH is reconfigured by the master controller through a command to the SEs to update their state from the state of their neighboring SEs. The specific neighbor is specified by the displacement δ in the command. If the l-th time counter is being incremented, then the displacement is the d+2+l-th component of $u_i$.

Formal analysis of the expressibility and properties of the present invention may be used as a target architectural model by hardware synthesis tools. The present invention may further be thought of as a logical architecture used by the programmer/compiler. It is contemplated by the present invention that the mapping of SMAs into bounded hardware resources may be related to partitioning and tiling.

The present invention will now be described by way of example:

Example I

Systolic array synthesis involves finding a space-time mapping of the problem domain, such that the mapping results in an architecture in which inter-processor communication is achieved with (i) a fixed amount of memory in each processor, (ii) a fixed number of interconnections, and (iii) fixed length interconnections. A crucial step in systolic synthesis from SAREs is the transformation of affine dependences into uniform ones, a process called uniformization. However, there is an important class of SAREs for which such a transformation is not possible, except by adding an additional dimension to the domains of the SARE, which may result in an inefficient processor array. In this example, it is shown that for such SAREs an efficient implementation in a purely systolic model is not possible (without a slowdown). This problem may thus be used to illustrate the power of SMAs and the need for more powerful architectures.

Uniformization transforms affine dependences into uniform ones by decomposing an affine dependence into a sequence of uniform ones. Formally, for an affine dependence $d(z)=A(z)+b$ of an ARE with domain D, the dependence vector of d is $\Theta_d=z-d(z)$. The uniformization of an affine dependence necessitates decomposing $\Theta_d(z)$ into a set of uniform dependences, such that their sum is $\Theta_d(z)$. This is done by expressing $\Theta_d(z)$ as an integral combination of a set of (uniformization/routing) vectors, such that $\Theta_d(z)=\Sigma_{j=1}^{\rho} \alpha_j(z)\phi_j$, where, ρ is a constant, $\forall_j=1 \ldots \rho$, $\alpha_j(z)$ is a linear function of z, and $\phi_j \in \mathbb{Z}$ are constant vectors called the uniformization vectors. The uniformization vectors are used for pipelining or routing the values from the producer to the consumer of a value.

The uniformization techniques may be classified broadly into two categories: those that are applicable when the dependence matrix is singular and the ones that are applicable when the dependence matrix is non-singular. Techniques like null-space pipelining described in Vwani P. Roychowdhury, Derivation, Extensions and Parallel Implementation of Regular Iterative Algorithms, PhD thesis, Stanford University, Department of Electrical Engineering, Stanford, Calif., December 1988, and F. C. Wong and Jean-Marc Delosme, Broadcast removal in systolic algorithms, In International Conference on Systolic Arrays, pp. 403-412, San Diego, Calif., May 1988, multi-stage pipelining described in S. V. Rajopadhye, Synthesizing systolic arrays with control signals from recurrence equations, Distributed Computing, 3:88-105, May 1989, and routing described in V.V. Dongen and P. Quinton, Uniformization of linear recurrence equations: a step towards the automatic synthesis of systolic arrays, In International Conference on Systolic Arrays, pp. 473-482, San Diego, Calif., May 1988, and M. Manjunathaiah et al., Uniformization of affine dependence programs for parallel embedded system design, in 30th International Conference on Parallel Processing, Valencia, Spain, September 2001, are applicable when the dependence matrix is singular, the entire contents and disclosures of which are hereby incorporated by reference. The folding technique described in Yoav Yaacoby and Peter R. Cappello, Converting affine recurrence equations to quasi-uniform recurrence equations, in AWOC 1988: Third International Workshop on Parallel Computation and VLSI Theory, Springer Verlag, June 1988, may be used with non-singular dependence matrices, A, that satisfy $A^k=I$ for some integer k, the entire contents and disclosure of which is hereby incorporated by reference.

In practice, there are many dependences that are non-singular and for which folding does not apply, for example, the dependence $X[i] \rightarrow X[2i]$. One simple and inefficient approach that is well known in the systolic literature, as discussed in Vwani P. Roychowdhury, Derivation, Extensions and Parallel Implementation of Regular Iterative Algorithms, PhD thesis, Stanford University, Department of Electrical Engineering, Stanford, Calif., December 1988, the entire contents and disclosure of which is hereby incorporated by reference, is to add an extra dimension to the problem, which would make the dependence singular, and then use the standard techniques to uniformize the dependence.

Figure 5:
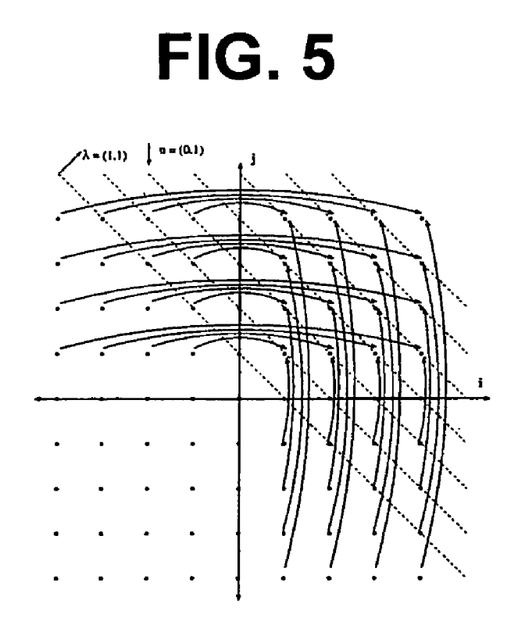
FIG. 5 is an extended dependence graph of an example program in accordance with an embodiment of the present invention.

Using the following SARE: D: $X[i,j]=Y[-i,j]+Y[i,-j]$, where, D $\{i,j|-N \leq i,j \leq N\}$. Though the folding technique may be applied to this SARE, the present example has chosen a simple structure that aids in explaining the uniformization scheme and the related issues. It should be appreciated that the technique of uniformization by adding a dimension is general and applicable to all cases. The extended dependence graph is shown in FIG. 5. Let $d_1$ denote the first dependence ($X[i,j] \rightarrow Y[-i,j]$) and $d_2$ denote the second dependence ($X[i,j] \rightarrow Y[i,-j]$). $\Theta_{d1}=(2i,0)$ and $\Theta_{d2}=(0,2j)$. The domain D spans all the four quadrants and the dependences are directed across these quadrants. Piece-wise linear schedules may be found for each of these four quadrants. For ease of exposition (and without loss of generality), the present example only considers the computation done in the first quadrant of D and the dependences $d_1$ and $d_2$.

Affine dependence may be uniformized, by adding (at most) one dimension to the problem domain. As mentioned above, the following procedure may be used for cases where the dependence matrix A is non-singular and folding is not applicable.

For an SARE S with domain D, let $d=Az+b$ be a dependence of S such that A is non-singular. The uniformization of d consists of the following steps: (i) Construct a domain D' (and an ARE S') by adding an extra dimension, k, to D. (ii) Align the variables (to the k=0 hyperplane) by adding a 0 in the newly added dimension. This would render singular (in S') all the non-singular dependences of S. This alignment employs conventional methods. (iii) Apply techniques like null-space pipelining or routing to uniformize them.

Figure 6:
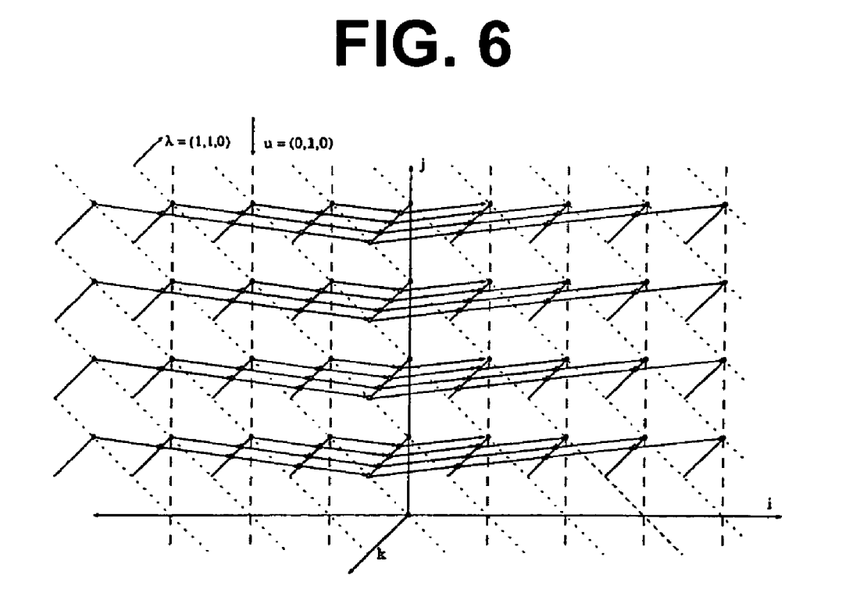
FIG. 6 is a graph of a uniformization of the graph of FIG. 5 by adding an extra dimension in accordance with an embodiment of the present invention.

The following architecture is derived for the present example, after uniformizing the dependences $d_1$ and $d_2$ by adding an extra dimension. Let $D'=\{i, j, k|-N \leq i, j, k \leq N\}$ be the domain obtained by adding a dimension to D. D' can uniformize $d_1$ and $d_2$ using the routing vectors $\phi_{d_1}^1=(1,0,1)$, $\phi_{d_1}^2=(1,0,-1)$ and $\phi_{d2}^1=(0,1,1)$, $\phi_{d2}^2=(0,1,-1)$, respectively. FIG. 6 shows the uniformization of $d_1$. $\Theta_{d1}$ and $\Theta_{d2}$ are expressed as follows:

$$(\Theta_{d1}, 0) = (2i, 0, 0) = i\phi_{d1}{}^1 + i\phi_{d1}{}^2$$

$$(\Theta_{d2}, 0) = (0, 2j, 0) = i\phi_{d2}{}^1 + i\phi_{d2}{}^2$$

It is shown that affine dependences may be uniformized by adding an extra dimension to the problem domain. If the original problem domain, D, was n-dimensional, then the resulting (uniformized) problem domain, D', is (n+1)-dimensional. In D', points are compute values and points are used purely for propagating values. These points are called computation points and propagation points, respectively. Under a one-dimensional schedule, D' will end up with a virtual processor array of n dimensions (for the original n-dimensional problem), in which an (n−1) dimensional plane contains the computation points and an n-dimensional domain (actually a box, atop the (n−1) dimensional plane) contains the propagating points.

Treating all these propagation points as processors is inefficient. The propagating points may be treated as memory elements instead of processors. With such a treatment, the present invention will provide an n-dimensional architecture for an n-dimensional problem domain, in which an n dimensional box of memory elements communicating with neighboring memory elements, for propagating values, is present. Every column of this n-dimensional box of memory elements has at its base a computation point referred to as its base processor. Treating the memory elements as local to their base processor would disallow memory to memory communication and allow only inter-processor communications. Such a constraint would lead to an architecture with (n−1) dimensions of processors and one di-mension of memory local to every processor. For an n-dimensional SARE with a 1-dimensional schedule, the present invention seeks to uniformize all the dependences by adding a dimension. The present invention uses an architecture that has the following properties:

1. 1-dimensional schedule (i.e., no slowdown in the execution time);
2. (n−1)-dimensions of processors;
3. 1-dimension of memory local each processor; and
4. bounded inter-processor data transfers.

In deriving the above architectural properties in the present example, the following class of schedule and allocation functions would allow an architecture with the above properties. There is no slowdown in the execution time with the uniformization of $d_1$ and $d_2$ given by (1) and (2). $\lambda' = (1,1,0)$, is a valid schedule for D'. As discussed elsewhere, a one-dimensional schedule for the uniformized SARE may be found. Next, with this uniformization, the following allocation function would satisfy the last three architectural properties. $u' = (0,1,0)$ is a valid projection vector that produces an architecture with (n−1) dimensions of processors and one dimension of memory. The characterization of the general form of allocation vectors that will produce architectures with these properties is discussed below. However, except for simple cases, a u' that satisfies the last constraint of bounded inter-processor communications has not been found.

In this example it is necessary to show that the uniformized SARE admits a one-dimensional linear schedule. It is known that if there exists a pointed cone that contains all the dependence vectors of a SARE then one may find a one-dimensional linear schedule for it, as described in Patrice Quinton and Vincent Van Dongen, The mapping of linear recurrence equations on regular arrays, Journal of VLSI Signal Processing, 1(2):95-113, 1989, the entire contents and disclosure of which is hereby incorporated by reference. The present invention constructs a pointed cone Γ' that contains all the dependence vectors of the uniformized SARE.

Given that the original SARE S admitted a (one-dimensional) schedule, the existence of a pointed cone, Γ, that contains all the dependence vectors of S is guaranteed. For uniformization the domain D of S is extended by adding a dimension, m. Quinton and Van Dongen, have shown that for an n-dimensional SARE, if the dependence cone Γ has n−1 dimensions, there always exists an n-dimensional pointed cone Γ' containing Γ and a basis for the extra dimension. The same situation is present in the (n+1)-dimensional SARE, and hence the results carry over trivially. Now, since Γ' is pointed, it has, as proved by A. Schrijver, Theory of Integer and Linear Programming, John Wiley and Sons, 1988, the entire contents and disclosure of which is hereby incorporated by reference, a unique minimal integral Hilbert basis $\{\phi_1, \ldots, \phi_k\}$ that generates Γ'.

The present invention uses the points in the newly added dimension m to route the values. The generators $\{\phi_1, \ldots, \phi_k\}$ of Γ' may be used as the routing vectors, since the generators of Γ' include a basis for the space spanned by m. Hence, all the dependence vectors of S may be expressed as integral affine combinations of $\{\phi_1, \ldots, \phi_k\}$. Further as Γ' is pointed, there exists a strongly separating hyperplane such that $h^t z > 0$ for all $z \in \Gamma'$. The existence of this hyperplane guarantees the existence of a one-dimensional linear schedule. A detailed discussion and proofs regarding the existence of a one-dimensional linear schedule for the uniformized SARE may be found in Quinton and Van Dongen.

The class of allocation functions suitable for SMAs in the present invention are as follows. Let S' be the (new) uniformized SARE, λ' its schedule, and u' its projection vector. There is freedom in the choice of the projection vector u'. Any u' that satisfies $\lambda'^T u' \neq 0$ is valid. A preferred projection vector may be chosen to map the ((n−1)-dimensional plane of) computation points to processors and the (n-dimensional box of) propagation points to memory elements local to virtual processors. Since the memory elements are along the newly added (last) dimension, a projection vector whose last component is zero would map them to their base processors. Any other projection vector, with a non-zero last component would map the propagation points into processors, which is not an efficient use of processors. Hence preferred projection vectors with a zero last component, i.e., projection vectors of the form u'=(u, 0) are used. Let Π be the allocation constructed from u such that Πu=0. The processor allocation, Π' of S' may be viewed as the memory extension of any valid allocation. Π may be constructed as follows:

$$\Pi' = \begin{pmatrix} \Pi & 0 \\ 0 & 1 \end{pmatrix},$$

which is valid since it satisfies the condition Π'u'=0. Hence, by choosing u'=(u, 0) a processor array with (n−1) dimensions of "true" processors and one dimension of memory is the result. These one-dimensional columns of memory, whose base is a processor, are referred to as memory banks local to or associated with the processor.

The interconnections between the memory elements in the original (n+1)-dimensional domain D' are determined by the uniformization vectors. The projection by u' transforms these interconnections into either intra-memory bank connections (connections that are local to a memory bank) or inter-memory bank connections (connection between memory banks).

For any non-zero vector $v \in Z^n$ the level of v denoted by level(v) is defined as the index of the first non-zero component of it. Note that $1 \leq \text{level}(v) \leq n$. For any routing vector $\phi$, if $\text{level}(\Pi'k)=n+1$, then the interconnection due to this routing vector $\phi$ may be mapped by u' into an intra-memory bank connection. These local connections represent values that are produced and consumed by the same processor (albeit after a period of time). The processor has to store the value until its last consumption, i.e. for the value's life time. These connections within memory banks may be implemented with FIFO structures.

When $\text{level}(\Pi'k) \leq n$, inter-memory bank communications may be used. There may be an unbounded number of such communications between any two banks, which may require an unbounded number of communication links between the memory banks. Essentially, at a given time instant, an unbounded amount of data transfer is required between two memory banks.

In the present example, the projection vector u'=(0,1,0) transforms the routing vectors $\phi_{d2}^1$ and $\phi_{d2}^2$ and into intra-memory-bank communications, and the routing vectors $\phi_{d1}^1$ and $\phi_{d1}^2$ are transformed into inter-memory-bank communications.

Except for the case where all the routing vectors are parallel to u', the case where there are some uniformization vectors $\phi$ such that $\text{level}(\Pi'k) \leq n$ may induce unbounded inter-memory bank data transfers. Allowing unbounded interconnections between memory banks is not practically feasible. In fact, bounded interconnections only between (the true) processors are desired, as the memory banks are local to processors. With this constraint imposed, the present invention still achieves the unbounded data transfer between memory banks, however not in a constant time. The transfer of an unbounded amount of data between two processors through a bounded number of interconnections, may require a time linearly proportional to the amount of data transferred. In the case of inter-memory bank communications realized through bounded inter-processor communication links, there may thus be a one dimensional slowdown in the linear schedule. Hence, such SAREs cannot be implemented in the purely systolic model without a dimensional slowdown. As discussed elsewhere, it is shown that such SAREs may be implemented using SMAs without any slowdown.

Example II

In this example, a SMA is derived for Example 1. First, a dimension is added, and all the dependences of Example 1 are aligned and uniformized. There are four uniformization vectors, $\phi_{d_1}^1=(1,0,1)$, $\phi_{d_1}^2=(1,0,-1)$ and $\phi_{d2}^1=(0,1,1)$, $\phi_{d2}^2=(0,1,-1)$. The method then finds $\lambda'=(1,1,0)$ as a valid schedule and u'=(0,1,0) as a projection vector. Using u' it is possible to derive $$T' = \begin{bmatrix} \Pi & 0 \\ 0 & 1 \end{bmatrix} = \begin{bmatrix} 1 & 0 & 0 \\ 0 & 0 & 1 \end{bmatrix}.$$

Using $\lambda'$ and $\Pi'$, it is possible to derive the space-time transformation $$T' = \begin{bmatrix} 1 & 1 & 0 \\ 1 & 0 & 0 \\ 0 & 0 & 1 \end{bmatrix}$$

for S'. Every uniformization vector induces a set of P memory banks, where P is the number of processors. The four uniformization vectors necessitate 4P memory banks. In an embodiment of the present invention, each one of these banks is of equal size to maximize over all processors the number of points mapped by H to a single processor.

For the ISWITCHes, the method of the present invention needs to compute $\delta_d$, $\delta_t$ and $\delta_m$ for the four uniformization vectors. For $\phi_{d1}^1$: $\delta_t=(1)$, $\delta_d=(1)$, and $\delta_m=(1)$, for $\phi_{d1}^2$: $\delta_t=(1)$, $\delta_d=(1)$, and $\delta_m=(-1)$, for $\phi_{d2}^1$: $\delta_t=(1)$, $\delta_d=(0)$, and $\delta_m=(1)$, and for $\phi_{d2}^2$ $\delta_t=(1)$, $\delta_d=(0)$, and $\delta_m=(-1)$. The $\delta_d$ for $\phi_{d2}^1$ and $\phi_{d2}^2$ is zero, and hence no ISWITCHes are required since the induced data transfers are intra-memory bank transfers. The 2P memory banks related to this data transfer are completely local to the P processors. For $\phi_{d_1}^1$ and $\phi_{d_1}^2$, two ISWITCHes are required, which will switch the interconnections at a distance of $^5d=1$.

The SMA is configured as follows. Every processor has two local memory banks and is connected to two ISWITCHes, which connect it to two memory banks. The two local memory banks are used to achieve the data transfer related to the dependence X[i,j]→Y[i, -j] (uniformized by $\phi^{d21}$ and $\phi_{d2}^2$), which is made local to each processor by the choice of projection vector. The two ISWITCHes and the associated two memory banks are used to achieve the inter-processor data transfers related to the dependence X[i, j]→Y[-i, j] (uniformized by $\phi_{d1}^1$ and $\phi_{d1}^2$), which are mapped into inter-processor communication. The first ISWITCH and the set of P memory banks associated with it are used for transferring the data from processors at (-i, j) to the processor at (0, j). The next ISWITCH and its set of P memory banks are used for transferring the data from the processor at (0, j) to processors at (i, j). Both the ISWITCHes shift the connections by a distance of 1, as discussed above.

Many optimizations are possible with respect to the number of memory banks and memory bank sizes. For example, the routing vectors $\phi_{d1}^1$ and $\phi_{d1}^2$ belong to the uniformization of the single dependence $d_1$, and hence their banks and switches may be merged. This will result in P banks and one switch for them, instead of two switches and 2P banks.

All documents, patents, journal articles and other materials cited in the present application are hereby incorporated by reference.

Although the present invention has been fully described in conjunction with the preferred embodiment thereof with reference to the accompanying drawings, it is to be understood that various changes and modifications may be apparent to those skilled in the art. Such changes and modifications are to be understood as included within the scope of the present invention as defined by the appended claims, unless they depart therefrom.

What is claimed is:

1. A machine with switch memory architecture comprising:
   a d-dimensional grid of N processing elements (PEs), where d and N are arbitrary integers;
   at least one d-dimensional grid of N memory banks (MBs); and
   at least one programmable interconnection switch (ISWITCH) having a (d+1)-dimensional grid of switching elements (SEs) configurable to interconnect the N PEs to N MBs, such that each memory bank (MB) of the N MBs is mapped local to one processing element (PE) of the N PEs, wherein the ISWITCH being reconfigurable to remap the interconnection of N PEs to N MBs such that each memory bank (MB) becomes local to a different PE of the N PEs;

wherein each SE transfers its state to a neighbor SE to remap the interconnection of N PEs to N MBs in a single clock cycle.

2. The machine of claim 1, wherein the ISWITCH interconnects the N PEs with N MBs such that each memory bank MB of the N MBs is local to no more than one processing element (PE) of the N PEs at any one time.

3. The machine of claim 1, wherein the machine is of the Single Instruction Multiple Data (SIMD) type, such that said N PEs are not independently programmable, and where the grid has $N_1 \times N_2 \times \ldots N_d$ PEs (where $N_1, N_2 \ldots N_d$, are arbitrary integers).

4. The machine of claim 1, wherein said N PEs, contain memory control information for accessing N MBs.

5. The machine of claim 1, wherein the ISWITCH is reconfigurable in a single clock cycle to rotationally reconnect each MB of the N MBs to a different PE of the N PEs; wherein rotationally reconnecting is reconnection such that where $MB_{(i)}$ is disconnected from $PE_{(i)}$ and connected to $PE_{(i+\delta)}$ modulo N for an integer i, $\delta$, and N.

6. The machine of claim 1, wherein each SE further comprises r(d+1) wires for passing through each switching element (SE), wherein r is an arbitrary integer.

7. The machine of claim 1, wherein the ISWITCH connects $N^d$ inputs to $N^d$ outputs and has ($N^{d+1}$) switching elements (SEs).

8. The machine of claim 1, wherein the ISWITCH comprises a defined PE-MB mapping of source to destination interconnection paths, each of which is extendable by a constant distance, $\delta$, during reconfiguration to remap the interconnection of the N PEs to the N MBs.

9. The machine of claim 1, wherein the PE-to-MB interconnections are invariant with time.

10. The machine of claim 1, wherein interconnections achieved by the ISWITCH are dynamic.

11. The machine of claim 1, the at least one d-dimensional grid of N MBs comprising a plurality of d-dimensional grids of N MBs, each MB of each of the grids of N MBs being connected to a PE of the d-dimensional grid of N PEs through one of a plurality of ISWITCHES.

12. The machine of claim 11, wherein the ISWITCH has r (d+1) wires for passing through each switch element (SE), where r is an arbitrary integer.

13. The machine of claim 11, wherein the ISWITCH may be configured to have broadcast interconnections such that one MB is local to a set of destination N PEs.

14. The machine of claim 1, the reconfiguration of the ISWITCH to remap the interconnection between N PEs and N MBs serving to transfer data from a first PE to which an MB is initially local to a second PE to which the MB becomes local upon the reconfiguration.

15. A method for implementing a machine with switch memory architecture, comprising:
configuring a programmable interconnection switch (ISWITCH) to interconnect a plurality of N processing elements (PEs) in a d-dimensional grid, where d is an arbitrary integer, with a plurality of N memory banks (MBs) organized as at least one d-dimensional grid such that each memory bank (MB) of each of the at least one N MBs is local to only one processing element (PE) of the N PEs at any one time;
reconfiguring the ISWITCH to rotationally reconnect each MB to a different PE in a single clock cycle;
wherein the ISWITCH comprises a (d+1) dimensional array of switching elements (SEs); and
wherein each SE transfers its state to a neighbor SE to remap the interconnection of N PEs to N MBs in a single clock cycle.

16. The method of claim 15, further comprising the step of reconfiguring the ISWITCH for remapping the interconnection of N PEs to N MBs such that each MB becomes local to a different PE.

17. The method of claim 16, wherein the step of reconfiguring ISWITCH for remapping the interconnection serves to transfer data from a PE to a MB was initially local to the PE to which the MB becomes local.

18. The method of claim 15, wherein there are a plurality of d-dimensional of N MBs, each of the grids of the N MBs being interconnected to the d-dimensional grid of N PEs through an ISWITCH.

19. The method of claim 15, wherein the reconnection is a rotational reconnection such that where $MB_{(i)}$ is disconnected from $PE_{(i)}$ and connected $PE_{(i+\delta)}$ modulo N for an integer i, $\delta$, and N.

* * * * *